United States Patent
Hartmann et al.

(10) Patent No.: US 11,009,206 B2
(45) Date of Patent: May 18, 2021

(54) LIGHTING TECHNOLOGY IN THE AUTOMOTIVE AREA

(71) Applicant: Osram GmbH, Munich (DE)

(72) Inventors: Andreas Hartmann, Ulm (DE); Thomas Feil, Iggingen (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 16/699,087

(22) Filed: Nov. 28, 2019

(65) Prior Publication Data

US 2020/0166190 A1    May 28, 2020

(30) Foreign Application Priority Data

Nov. 28, 2018  (DE) .................... 10 2018 220 507.8

(51) Int. Cl.
| | |
|---|---|
| *F21S 41/24* | (2018.01) |
| *F21S 41/25* | (2018.01) |
| *F21S 41/155* | (2018.01) |
| *G02B 6/26* | (2006.01) |
| *G02B 6/293* | (2006.01) |

(52) U.S. Cl.
CPC ............ *F21S 41/24* (2018.01); *F21S 41/155* (2018.01); *F21S 41/25* (2018.01); *G02B 6/262* (2013.01); *G02B 6/29317* (2013.01)

(58) Field of Classification Search
CPC .......... F21S 41/24; F21S 41/25; F21S 41/155; G02B 6/29317; G02B 6/262
See application file for complete search history.

(56) References Cited

U.S. PATENT DOCUMENTS

2013/0322820 A1* 12/2013 Zwick .................... G02B 6/262
385/31

FOREIGN PATENT DOCUMENTS

EP          3210827 A1 *  8/2017  ........... G02B 6/0078

* cited by examiner

*Primary Examiner* — Joseph L Williams
(74) *Attorney, Agent, or Firm* — Imperium Patent Works; Darien K. Wallace

(57) ABSTRACT

An optical system includes optical fibers, a decoupling surface, an intersecting surface and a connecting portion. The optical fibers are arranged in at least one row. Each of the optical fibers includes a coupling surface onto which light from a light source is received. Light is directed through the optical fibers along an optical main axis. Light emitted from the optical fibers is directed onto a decoupling surface. The connecting portion is planar and is disposed between the decoupling surface and the optical fibers. The intersecting surface bounds the decoupling surface and is parallel to the optical main axis. Each of the optical fibers has an intersecting face oriented parallel to the optical main axis and parallel to the intersecting surface. The intersecting surface and the intersecting faces of the optical fibers generate a sharp outer edge of a light pattern formed by light emitted from the optical system.

20 Claims, 3 Drawing Sheets

LIGHTING TECHNOLOGY IN THE AUTOMOTIVE AREA

CROSS REFERENCE TO RELATED APPLICATION

This application is based on and hereby claims the benefit under 35 U.S.C. § 119 from German Patent Application No. DE 102018220507.8, filed on Nov. 28, 2018, in the German Patent Office. This application is a continuation-in-part of German Patent Application No. DE 102018220507.8, the contents of which are incorporated herein by reference.

TECHNICAL FIELD

The invention relates to an optical system for a headlight and an optical assembly for a vehicle.

BACKGROUND

For lighting applications, for example in the vehicle sector, individually adapted light patterns as well as individually adapted light pattern shapes, such as an individually adapted outer contour of the light pattern, are usually required. The design of the light patterns depends on optical elements such as reflectors or lenses, which may be part of a vehicle headlight.

Projector systems are known that include light sources arranged in a matrix-like fashion. The projector system includes at least one primary lens or optical system connected downstream of the light sources, as well as a secondary lens which in turn is connected downstream of the primary lens. The secondary lens, for example, projects the light pattern, which is formed or imaged by the primary lens on its focal plane, into a far field. For example, the prior art describes segmented primary lenses that have a large number of individual optical fibers, each having its own light source. This makes it possible to illuminate a limited area by switching individual light sources on or off, such as with an Adaptive Driving Beam (ADB). An outer contour of the entire light pattern is then generated by the sum of the individual illuminated areas.

An object of the present invention is to create an optical system for the output of an improved light pattern, an assembly for the output of the improved light pattern and a headlight for the output of the improved light pattern.

SUMMARY

An optical system is disclosed that includes a plurality of optical fibers, which are arranged in a row. Each of the optical fibers includes a coupling surface into which light from a light source can be coupled. Each of the optical fibers opens into a common decoupling surface. The decoupling surface is delimited by an intersecting surface, and an intersecting face forms a side of each optical fiber. The intersection surface and intersecting faces all lie in a common curvature or plane and enable the optical system to generate a light pattern of the light emitted from the optical system that has a defined sharp outer edge.

An optical system includes a plurality of optical fibers, a decoupling surface, an intersecting surface and a connecting portion. The optical fibers are arranged in at least one row. Each of the optical fibers includes a coupling surface onto which light from a light source is received. The light is directed through the optical fibers along an optical main axis of the optical system. Light emitted from the plurality of optical fibers is directed onto the decoupling surface. The connecting portion is disposed between the decoupling surface and the optical fibers. Each of the optical fibers contacts the connecting portion on a side of the optical fiber opposite its coupling surface. The intersecting surface bounds the decoupling surface and is oriented parallel to the optical main axis. Each of the optical fibers has an intersecting face oriented parallel to the optical main axis, and each intersecting face is parallel to the intersecting surface. The intersecting surface and each intersecting face of the optical fibers all lie along a single curvature. The intersecting surface and each intersecting face generate a defined outer edge of a light pattern formed by light emitted from the optical system.

A headlight of a vehicle that includes a light source, a plurality of optical fibers, a decoupling surface, an intersecting surface, a connecting portion, and a secondary lens. The optical fibers are arranged in at least one row. Each of the optical fibers includes a coupling surface onto which light from the light source is received. The light is directed through the optical fibers along an optical main axis. Light emitted from the plurality of optical fibers is directed onto the decoupling surface. The intersecting surface bounds the decoupling surface and is parallel to the optical main axis. Each of the optical fibers has an intersecting face oriented parallel to the optical main axis. Each intersecting face is parallel to the intersecting surface. The intersecting surface and the intersecting faces of the optical fibers all lie in a single plane. The connecting portion is disposed between the decoupling surface and the optical fibers. The connecting portion is planar and is oriented perpendicular to the optical main axis of the optical system. Each of the optical fibers contacts the connecting portion on a side of the optical fiber opposite its coupling surface. Light emitted from the decoupling surface is directed onto the secondary lens. The intersecting surface and the intersecting faces of the optical fibers generate a defined outer edge of a light pattern formed by light emitted from the secondary lens.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
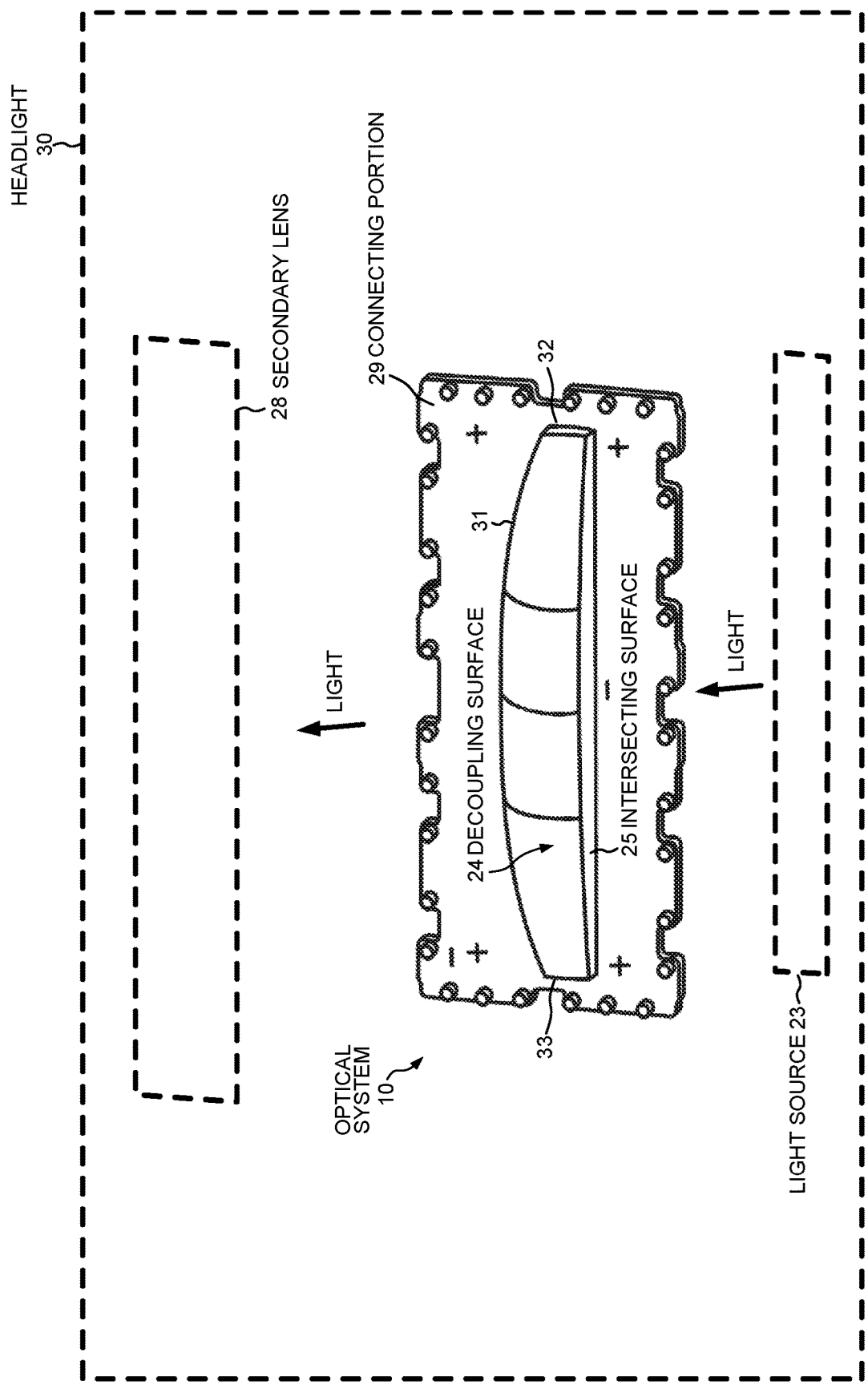
FIG. 1 is a perspective top view of an exemplary embodiment of the optical system of the invention.
Figure 2:
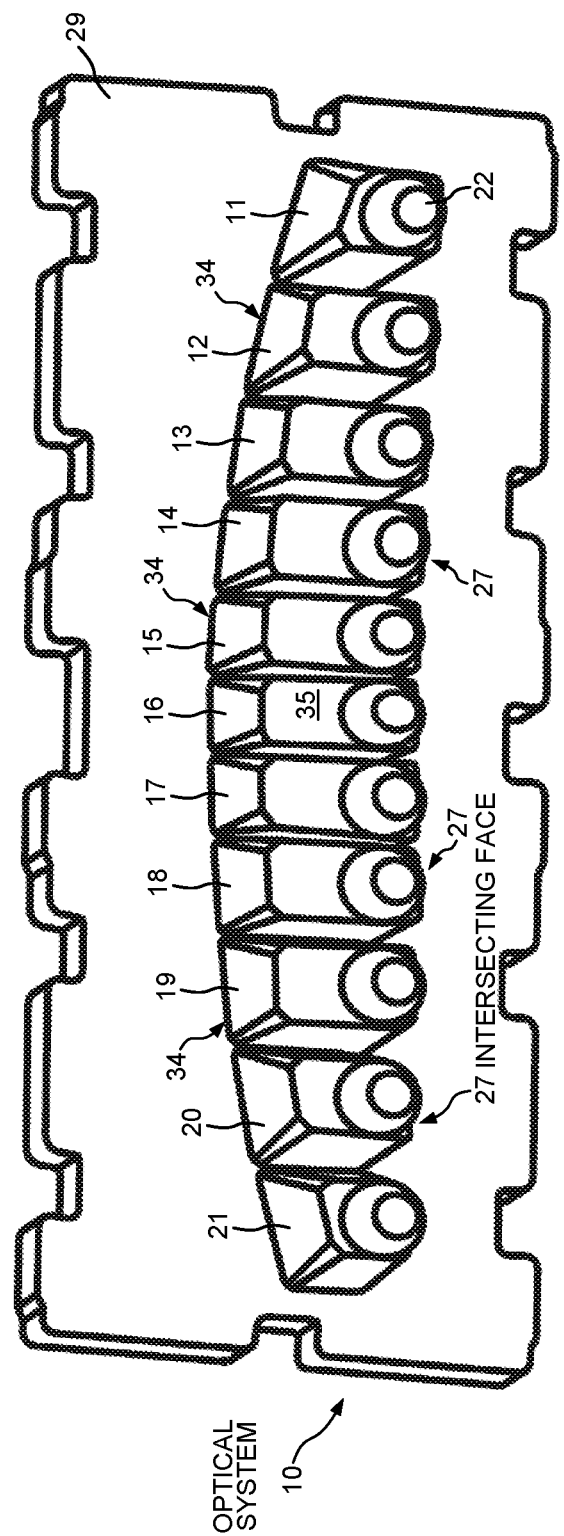
FIG. 2 is a perspective bottom view of the optical system.
Figure 3:
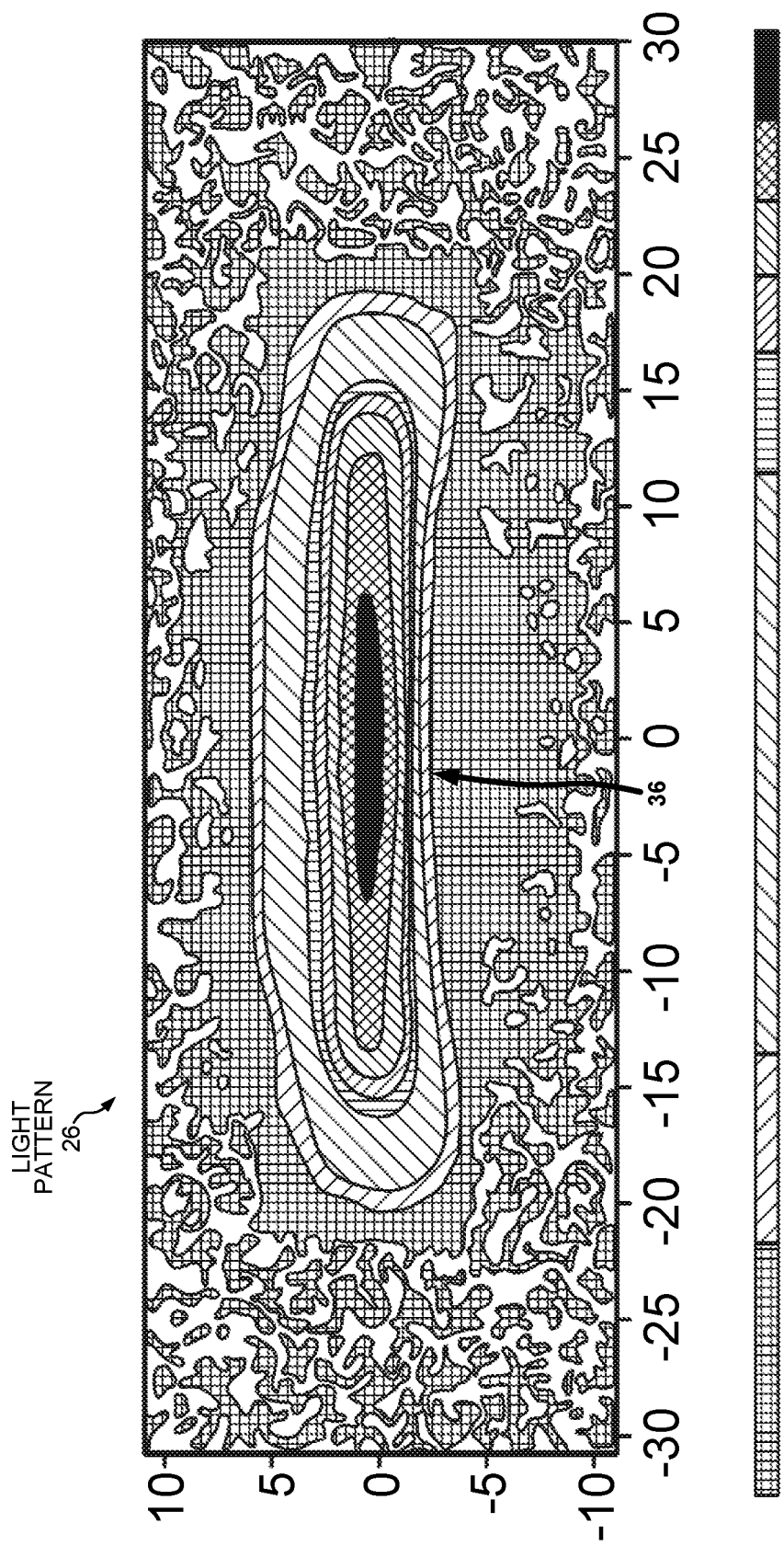
FIG. 3 shows an output light pattern of the optical system.

According to the invention, an optical system 10 or optic is provided as shown in FIG. 1. The optical system 10 has a plurality of optical fibers 11-21 as shown in FIG. 2 that are arranged in at least one row or in several rows. The rows need not be in straight lines. Each of the optical fibers 11-21 has a coupling surface 22 into which light from a light source 23 or light sources is received. The optical system 10 has a decoupling surface 24 through which the light is emitted. Preferably, an intersecting surface 25 is provided in the area of the decoupling surface 24 of the optical system 10 that can limit the decoupling surface at least in sections in order to provide a defined, high-contrast outer edge or outer contour of a light pattern 26, as shown in FIG. 3, that is generated by the light emerging from the decoupling surface 24 and the optical system 10. In addition, an intersecting face 27 is formed on some of the optical fibers 11-21 or on all of the optical fibers that laterally limits the respective optical fiber. This allows a defined outer edge to be created with simple technical means in sections of the light pattern 26.

This solution has the advantage that the intersecting face allows a sharp outer contour of the light pattern 26 to be easily formed along a desired line or curvature. In other words, a desired light pattern can be realized by designing the optical system 10 as a primary lens. Another advantage is that a sharp separation between light and dark areas, i.e., a sharp light-dark contrast, can be achieved that enables certain areas to be faded out or not illuminated. If the optical system 10 is provided in a vehicle, this makes it possible, for example, not to blind oncoming drivers. Advantageously, an outer edge or outer contour of the light pattern 26, or a light pattern contour, can be individually adapted to customer requirements by specially designing the optical system 10. Furthermore, the light distribution output or the output light pattern can be adapted to regulatory requirements with simple technical means.

The optical fibers 11-21 are advantageously arranged adjacent to one another in at least one row. It is also possible to provide several rows of optical fibers 11-21. Each row can then have one or more optical fibers, especially adjacent ones. In other words, the optical fibers 11-21 may be arranged in a matrix, such as a linear matrix. In that case, it is preferred that an intersecting face 27 is provided for an outer row of optical fibers 11-21 as seen from the optical main axis along which the optical fibers enter the optical system 10. In this way, a space-saving design of the optical system 10 is possible.

The decoupling surface 24 is convex when viewed from the outside. Thus, the desired light pattern 26 can be directed to the secondary lens 28.

Light from a light source 23 can be coupled into each optical fiber 11-21 via the respective coupling surface 22 of the optical fiber. The coupling surfaces 22 of the individual optical fibers 11-21 are preferably arranged in one plane. This allows a space-saving design of the optical system 10, which is particularly preferred. The coupling surface 22 may also be designed as part of a TIR lens (Total Internal Reflection). The TIR lens can have a refractive coupling surface 22 and a refractive decoupling surface 24. An outer shell surface may have a parabolic design and be formed as a TIR surface. A central light path and a lateral light path can enter the TIR lens. The radiation in the lateral light path can be reflected at the TIR surface. This is advantageous for directing all light entering the coupling surface 22 to a desired direction. Scattering losses and/or crosstalk of individual optical fibers 11-21 can thus be prevented or at least reduced.

The optical system 10 advantageously includes a planar connecting portion 29. The decoupling surface 24 is arranged on the connecting portion 29 so as to face away from the coupling surfaces of the optical fibers such that the optical fibers 11-21 open into it. Thus, the decoupling surface 24 of the optical system 10 is formed on the connecting portion 29 on the side facing away from the optical fibers 11-21. Any light that couples into the respective coupling surfaces of the optical fibers 11-21 can be advantageously decoupled from the optical system 10 by the decoupling surface 24. The connecting portion 29 is oriented perpendicular to the optical main axis or the optical main radiation direction of the optical system 10. The connecting portion 29 can have mounting recesses or knobs with which the optical system 10 can be mounted onto another component. Due to its planar design, the connecting portion 29 can also be used at least in sections as a contact surface for other components. This is advantageous for an easy assembly of the optical system 10. It is conceivable to give the connecting portion 29 a flange-like design.

At least one of the optical fibers 11-21 or even all of the optical fibers may have a cross-section with a rectangular, square, triangular, round and/or elliptical shape. In this context, at least one optical fiber or some of the optical fibers 11-21 or all of the optical fibers 11-21 can preferably have a frustoconical or frustopyramidal shape that broadens towards the connecting portion 29 and decoupling surface 24. Thus, a desired light path may be made possible by the optical system 10.

If at least one intersecting face 27 is provided on one or more optical fibers 11-21, it may form a peripheral surface portion of the respective optical fiber. The intersecting faces 27 of the optical fibers 11-21 can be arranged adjacent to each other such that they lie in a plane or extend along a single curvature.

The intersecting faces extend parallel to the optical main axis of the optical system 10. This is advantageous for enabling a particularly sharp outer contour of the light pattern 26. It is especially preferred that the intersecting surface 25 adjacent to the decoupling surface 24 as well as the intersecting faces 27 of the optical fibers 11-21 be arranged in a common plane that is parallel to the optical main axis of the optical system 10. In other words, an advantageous design is that the intersecting surface 25 adjacent the decoupling surface 24 and the intersecting faces 27 of the optical fibers 11-21 lie congruently in one plane. For example, the intersecting surface and faces 25, 27 can be arranged at a right angle to the connecting portion 29. However, it is also possible for the intersecting surface and faces 25, 27 to be oriented at a different angle relative to the connecting portion 29. It is also conceivable that the intersecting faces follow a common curvature. It is also possible for the decoupling surface 24 to project beyond the intersecting faces 27 of the optical fibers 11-21 as seen from the optical main axis of the optical system 10.

The decoupling surface 24 has a curved surface edge on the side opposite the intersecting surface 25 as seen transverse to the optical main axis. This curved edge approaches the intersecting surface 25 that borders the decoupling surface 24 towards its ends and thus, for example, is shaped as an arc. This results in a particularly advantageous design of the output light pattern 26 with a light pattern height becoming smaller towards the outer edges of the light pattern 26.

The optical fibers 11-21 have a combined peripheral surface portion that faces away from the intersecting faces 27 and extends along a curvature. For example, the curvature can approach the intersecting faces 27 at both ends, starting from a central region of the row of optical fibers.

The light source 23 can be realized as: an incandescent lamp, a halogen lamp, a halogen retrofit LED lamp, an LED lamp for automotive applications, such as the OSRAM XLS LED lamp (as described for example in German patent application DE 202014002809 U1); a light-emitting diode (LED); a pixel-based LED (such as the OSRAM EVIYOS-COB matrix light source) or generally a semiconductor light source with matrix arrangements, a laser (such as one operating according to the principle of a Laser Activated Remote Phosphor (LARP) system (Note: the term "phosphor" also includes phosphor-free luminescent materials in technical terminology), an IR radiation source, in particular an IR laser diode, or any other device that emits, reproduces and/or generates electromagnetic radiation in, partially in or near the visible range of light. A light-emitting diode is to be understood in particular as an LED with a downstream luminescent material for the partial conversion of primary light (emission light of the LED) into secondary light (conversion light of the luminescent material); a warm-white light-emitting LED; a cold-white light-emitting LED; an LED that is operated in full conversion; an LED without a downstream luminescent material; a pixel-based LED matrix arrangement; an organic LED (OLED) and/or the like. Preferably, the LEDs emit white light in the standardized ECE white field of the automotive industry, e.g., realized by a blue emitter and a yellow/green converter. This means that the light source 23 can be provided for an additional light function in a vehicle, such as a fog light function, a daytime running light function, a dimmed headlights function, a high beam function or a similar function.

The light emitting diode (LED) may be present in the form of at least one individually packaged LED or in the form of at least one LED chip comprising one or more light emitting diodes, or in the form of a micro LED or a nano LED (smart dust). Several LED chips can be mounted on a common substrate ("submount") and form an LED, or they can be mounted individually or in combination on a board (e.g., FR4, metal core board, etc.) such as a chip on board (CoB). The at least one LED can be equipped with at least one own and/or a common optical system 10 for beam guidance, for example with at least one Fresnel lens or with a collimator. Instead of or in addition to inorganic LEDs (such as based on AlInGaN or InGaN or AlInGaP), organic LEDs (OLEDs, for example polymer OLEDs) can also be used. The LED chips can be of the directly emitting type or may have an upstream luminescent material. Alternatively, the light-emitting component can be a laser diode or a laser diode array. An OLED luminous layer or several OLED luminous layers or an OLED luminous area can also be provided. The emission wavelengths of the light-emitting components can be in the ultraviolet, visible or infrared spectral range. The light-emitting components can additionally be equipped with their own converter. The LED chips can emit white light in the standardized ECE white field of the automotive industry, for example realized by a blue emitter and a yellow/green converter.

According to the invention, an assembly is also provided. This can advantageously include the optical system 10 according to one or more of the previous aspects. The assembly also includes a light source 23. The assembly can have one light source 23 for each optical fiber. In addition, the assembly can have a secondary lens 28 through which the light emitted by the optical system 10 can be directed further into a far field, for example an area to be illuminated, as shown in FIG. 1.

According to the invention, a headlight 30 is also provided that includes the optical system 10 and/or the assembly according to one of the preceding aspects.

The headlight 30 is preferably used in a vehicle. The vehicle may be an aircraft or a waterborne vehicle or a land-based vehicle. The land-based vehicle may be a motor vehicle or a rail vehicle or a bicycle. It is especially preferred that the vehicle be a passenger car, a truck or a motorcycle. The vehicle may also be an autonomous, semi-autonomous, or non-autonomous vehicle. If the headlight 30 is used for a vehicle, it is then preferably a front headlamp. The optical system 10 can then be used, for example, for an Adaptive Driving Beam (ADB) matrix.

Further application areas for the headlight 30 can be effect lighting, entertainment lighting, architectural lighting, general lighting, medical and therapeutic lighting or lighting for horticulture.

An optical system 10 is provided that includes a large number of optical fibers 11-21, each of which being arranged in a row. The optical fibers 11-21 each have a coupling surface 22 into which light from a light source 23 is coupled. The fibers open into a common decoupling surface 24. In the area of the decoupling surface 24 and/or of the optical fibers 11-21, an intersecting surface 25 and intersecting faces 27 are provided that bound the decoupling surface 24 or a respective optical fiber in each case, in order to produce a defined, sharp outer edge of a light pattern 26 of the emitted light.

FIG. 1 shows an optical system 10 according to the invention. The optical system 10 has a planar connecting portion 29 into which optical fibers open. The optical fibers 11-21 can be seen in FIG. 2 but not in FIG. 1. A decoupling surface 24 is arranged in the optical system 10. This decoupling surface 24 has an approximately convex shape and projects outward from the connecting portion 29. The decoupling surface 24 is bounded by an intersecting surface 25 that intersects the decoupling surface 24 and is oriented at a right angle to the connecting portion 29 and parallel to the optical main axis. The decoupling surface 24 has a curved edge 31 on the side opposite the intersecting surface 25. The curved edge 31 approaches the intersecting surface 25 towards the ends of the decoupling surface 24. The decoupling surface 24 has an elongated shape and has an end surface 32, 33 at each of its short sides that is perpendicular to the connecting portion 29.

The optical system 10 is advantageously arranged together with a secondary lens 28 and at least one light source 23 or a plurality of light sources 23 in a headlight 30. The secondary lens 28 and light source 23 are shown schematically in FIG. 1 by broken lines.

FIG. 2 shows another view of the optical system 10 of FIG. 1. The ends of eleven optical fibers 11-21 can be seen, each with a coupling surface 22 (for the sake of simplicity provided with a reference numeral only on optical fiber 11). The coupling surface 22 is designed in the form of a TIR lens (Total Internal Reflection) or as part of a TIR lens. The optical fibers 11-21 are formed to be frustopyramidal or frustoconical and are arranged in a row. Each optical fiber opens into the connecting portion 29 on the side facing away from the respective coupling surface 22. The optical fibers 11-21 widen in their cross-section towards the center of the row of the optical fibers 11-21 along a curvature 34, with the optical fibers 11 and 21 being the narrowest ones at the respective ends of the row and having the smallest cross-section, and the optical fiber 16 towards the center of the row being the widest one and thus having the largest cross-section of the optical fibers 11-21. Adjacent to the coupling surface 22, each of the optical fibers 11-21 has a contact surface 35 (for simplicity's sake only provided with a reference numeral on the optical fiber 16), which is designed in different sizes depending on the width or cross-section of the optical fibers 11-21. Thus, the optical fiber 16 has the largest contact surface 35, whereas the optical fibers 11 and 21 at the ends of the row have only a comparatively small contact surface 35. The optical fibers 11-21 are approximately frustopyramidal, where three sides of the optical fibers 11-21 are each angled away from perpendicular to the connecting portion 29, whereas the fourth side has an intersecting face 27 (not directly visible in the view of FIG. 2, therefore marked only by arrows) that is perpendicular to the connecting portion 29. The intersecting faces 27 of each optical fibers 11-21 are arranged in a common plane, which is perpendicular to the connecting portion 29 of the optical system 10.

FIG. 3 shows a light pattern 26 output by the optical system 10 of FIGS. 1-2. It can be seen that the light pattern 26 of the optical system 10 is bent downwards towards the lateral edges (here shown in the horizontal). An area with a sharp outer edge or separating edge 36 of the light pattern 26 is generated by the optical system 10 in the central region of the light pattern corresponding to the side where the intersecting surface 25 and faces 27 are located.

A softer light transition is apparent at the upper side of the light pattern 26 facing away from the intersecting surface 25 and intersecting faces 27.

LIST OF REFERENCE NUMERALS 10 optical system
11-21 optical fibers
22 coupling surface
23 light source
24 decoupling surface
25 intersecting face
26 light pattern
27 intersecting face
28 secondary lens
29 connecting portion
30 headlight
31 edge
32 end surface of decoupling surface
33 end surface of decoupling surface
34 curvature
35 contact surface
36 separating edge Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An optical system, comprising:
a plurality of optical fibers, wherein the optical fibers are arranged in at least one row, wherein each of the optical fibers includes a coupling surface onto which light from a light source is received, and wherein light is directed through the optical fibers along an optical main axis of the optical system;
a decoupling surface onto which light emitted from the plurality of optical fibers is directed; and
an intersecting surface that bounds the decoupling surface, wherein the intersecting surface is parallel to the optical main axis, wherein each of the optical fibers has an intersecting face oriented parallel to the optical main axis, wherein each intersecting face is parallel to the intersecting surface, and wherein the intersecting surface and each intersecting face generate a defined outer edge of a light pattern formed by light emitted from the optical system.

2. The optical system of claim 1, wherein the coupling surfaces of the optical fibers all lie in a single plane.

3. The optical system of claim 1, wherein the intersecting surface and the intersecting faces of the optical fibers all lie in a single plane.

4. The optical system of claim 1, wherein each of the optical fibers has a rectangular cross section, and wherein the intersecting face of each of the optical fibers passes through a side of the rectangular cross section.

5. The optical system of claim 1, wherein each of the optical fibers has a frustopyramidal shape that broadens towards the decoupling surface.

6. The optical system of claim 1, further comprising:
a connecting portion disposed between the decoupling surface and the optical fibers, wherein each of the optical fibers contacts the connecting portion on a side of the optical fiber opposite its coupling surface.

7. The optical system of claim 6, wherein the connecting portion is planar and oriented perpendicular to the optical main axis of the optical system.

8. The optical system of claim 1, wherein the intersecting surface is oriented parallel to the optical main axis of the optical system.

9. The optical system of claim 1, wherein the intersecting faces of the optical fibers extend along a common curvature.

10. The optical system of claim 1, wherein the decoupling surface has a curved edge on opposite the intersecting surface, and wherein the curved edge has ends that approach the intersecting surface.

11. The optical system of claim 1, wherein each of the optical fibers has a surface portion opposite its intersecting face, wherein the surface portions of the optical fibers extend along a common curvature, and wherein the common curvature intersects the curved edge of the decoupling surface.

12. An assembly, comprising:
a light source taken from the group consisting of: an incandescent lamp, a halogen lamp, a light-emitting diode, and an organic light-emitting diode (OLED); and
an optical system, wherein the optical system further comprises:
a plurality of optical fibers, wherein each of the optical fibers includes a coupling surface onto which light from the light source is received, and wherein light is directed through the optical fibers along an optical main axis of the optical system;
a decoupling surface onto which light emitted from the plurality of optical fibers is directed; and
an intersecting surface that delimits the decoupling surface, wherein the intersecting surface is parallel to the optical main axis, wherein each of the optical fibers has an intersecting face oriented parallel to the optical main axis, wherein each intersecting face is parallel to the intersecting surface, and wherein the intersecting surface and each intersecting face of the optical fibers all lie along a single curvature.

13. The assembly of claim 12, wherein the optical system further comprises:
a connecting portion disposed between the decoupling surface and the optical fibers, wherein each of the optical fibers contacts the connecting portion on a side of the optical fiber opposite its coupling surface, and wherein the connecting portion is planar and oriented perpendicular to the optical main axis of the optical system.

14. The assembly of claim 12, further comprising:
a lens onto which light emitted from the decoupling surface is directed, wherein the intersecting surface and each intersecting face generate a defined outer edge of a light pattern formed by light emitted from the lens.

15. The assembly of claim 12, wherein the decoupling surface has a curved edge on opposite the intersecting surface, and wherein the curved edge has ends that approach the intersecting surface.

16. A headlight of a vehicle, comprising:
a light source;
a plurality of optical fibers arranged in at least one row, wherein each of the optical fibers includes a coupling surface onto which light from the light source is received, and wherein light is directed through the optical fibers along an optical main axis;
a decoupling surface onto which light emitted from the plurality of optical fibers is directed;
an intersecting surface that bounds the decoupling surface, wherein the intersecting surface is parallel to the optical main axis, wherein each of the optical fibers has an intersecting face oriented parallel to the optical main axis, and wherein each intersecting face is parallel to the intersecting surface; and
a lens onto which light emitted from the decoupling surface is directed, wherein the intersecting surface and each intersecting face generate a defined outer edge of a light pattern formed by light emitted from the lens.

17. The headlight of claim 16, further comprising:
a connecting portion disposed between the decoupling surface and the optical fibers, wherein each of the optical fibers contacts the connecting portion on a side of the optical fiber opposite its coupling surface.

18. The headlight of claim 17, wherein the connecting portion is planar and oriented perpendicular to the optical main axis of the optical system.

19. The headlight of claim 16, wherein the intersecting surface and the intersecting faces of the optical fibers all lie in a single plane.

20. The headlight of claim 16, wherein the intersecting faces of the optical fibers extend along a common curvature.

* * * * *